US008529347B2

(12) United States Patent
D'Amico et al.

(10) Patent No.: US 8,529,347 B2
(45) Date of Patent: Sep. 10, 2013

(54) GAMING SYSTEM CUSTOMER SERVICE TECHNIQUES

(75) Inventors: Michael H. D'Amico, Las Vegas, NV (US); Xiaoqiang D. Gong, Henderson, NV (US); Frederick Van Baltz, Las Vegas, NV (US); Lattamore D. Osburn, Las Vegas, NV (US); Tara C. Young, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 682 days.

(21) Appl. No.: 11/303,240

(22) Filed: Dec. 16, 2005

(65) Prior Publication Data

US 2006/0094508 A1 May 4, 2006

Related U.S. Application Data

(63) Continuation of application No. 09/982,244, filed on Oct. 17, 2001, now abandoned.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................................. 463/42; 463/40; 463/43

(58) Field of Classification Search
USPC ........................................... 463/42; 705/186
See application file for complete search history.

(56) References Cited

U.S. PATENT DOCUMENTS

| | | | |
|---|---|---|---|
| 4,722,053 A | 1/1988 | Dubno et al. | |
| 5,197,009 A * | 3/1993 | Hoffman et al. | 701/200 |
| 5,259,613 A * | 11/1993 | Marnell, II | 463/42 |
| 5,262,938 A | 11/1993 | Rapoport et al. | |
| 5,283,734 A * | 2/1994 | Von Kohorn | 463/17 |
| 5,429,361 A | 7/1995 | Raven et al. | |
| 5,752,882 A | 5/1998 | Acres et al. | |
| 5,770,533 A | 6/1998 | Franchi | |
| 5,830,068 A * | 11/1998 | Brenner et al. | 463/42 |
| 5,845,263 A | 12/1998 | Camaisa et al. | |
| 5,951,397 A | 9/1999 | Dickinson | |
| 5,971,271 A * | 10/1999 | Wynn et al. | 235/380 |
| 5,971,849 A | 10/1999 | Falciglia | |
| 5,984,786 A | 11/1999 | Ehrman | |

(Continued)

FOREIGN PATENT DOCUMENTS

| | | |
|---|---|---|
| EP | 0769769 A1 | 4/1997 |
| WO | 01/54025 | 7/2001 |

OTHER PUBLICATIONS

Canadian Intellectual Property Office, Examiner's Report, dated Apr. 23, 2010, in CA2463698.

(Continued)

*Primary Examiner* — Michael Cuff
*Assistant Examiner* — Kevin Y Kim
(74) *Attorney, Agent, or Firm* — McAndrews, Held & Malloy, Ltd.

(57) ABSTRACT

A gaming system (100) includes gaming locations (102, 104, 106) that each comprise an interactive communication unit (119), including a display 118 visible from the gaming location. A network (126) is arranged to transmit data between the communication units. A touch screen liquid crystal display (118) unrelated to the operation of a gaming machine (102) generates graphics images.

15 Claims, 11 Drawing Sheets

(56) References Cited

U.S. PATENT DOCUMENTS

| | | | |
|---|---|---|---|
| 6,099,408 A * | 8/2000 | Schneier et al. | 463/29 |
| 6,110,041 A | 8/2000 | Walker et al. | |
| 6,135,884 A | 10/2000 | Hedrick et al. | |
| 6,174,235 B1 | 1/2001 | Walker et al. | |
| 6,210,279 B1 | 4/2001 | Dickinson | |
| 6,241,612 B1 | 6/2001 | Heredia | |
| 6,264,557 B1 | 7/2001 | Schneier et al. | |
| 6,264,562 B1 | 7/2001 | McSheffrey et al. | |
| 6,293,866 B1 | 9/2001 | Walker et al. | |
| 6,424,264 B1 | 7/2002 | Giraldin et al. | |
| 6,450,885 B2 | 9/2002 | Schneier et al. | |
| 6,561,902 B1 | 5/2003 | Walker et al. | |
| 6,761,633 B2 | 7/2004 | Riendeau et al. | |
| 7,022,017 B1 * | 4/2006 | Halbritter et al. | 463/42 |
| 7,278,921 B1 * | 10/2007 | Fujisawa et al. | 463/42 |
| 2001/0009868 A1 * | 7/2001 | Sakaguchi et al. | 463/42 |
| 2001/0044339 A1 * | 11/2001 | Cordero et al. | 463/42 |
| 2002/0013173 A1 | 1/2002 | Walker et al. | |
| 2002/0086732 A1 | 7/2002 | Kirmse et al. | |
| 2002/0107065 A1 | 8/2002 | Rowe | |
| 2002/0116284 A1 | 8/2002 | Steelman et al. | |
| 2002/0133418 A1 | 9/2002 | Hammond et al. | |
| 2002/0142846 A1 | 10/2002 | Paulsen | |
| 2002/0151366 A1 | 10/2002 | Walker et al. | |
| 2003/0003988 A1 | 1/2003 | Walker et al. | |
| 2003/0032479 A1 | 2/2003 | LeMay et al. | |
| 2003/0054868 A1 | 3/2003 | Paulsen et al. | |
| 2003/0054879 A1 | 3/2003 | Schneier et al. | |

OTHER PUBLICATIONS

European Patent Office, Communication pursuant to Article 94(3) EPC, in Application No. 02 768 876.1-1241, dated Jun. 30, 2011.

European Patent Office, Summons to Attend Oral Proceedings Pursuant to Rule 115(1) EPC, in Application No. 02768876.1-1241/1444602, dated Sep. 27, 2012. (7 pages).

* cited by examiner

FIG. 13

PERSONAL MESSAGE MENU

1. SEND TO THE FOLLOWING PERSON(S): _____

2. SEND TO LOCATION OR PLAYER ID NUMBER: _____

3. CONTENT OF MESSAGE:

| 1 | 2 | 3 | 4 | 5 | 6 | 7 | 8 | 9 | 0 | ← |
|---|---|---|---|---|---|---|---|---|---|---|
| Q | W | E | R | T | Y | U | I | O | P | EN-TER |
| A | S | D | F | G | H | J | K | L | : ; | " ` |
| Z | X | C | V | B | N | M | < , | > . | ? / | SHI-FT |

TO: JOHN DOE
LOCATION OR ID: 106
CONTENT: MEET ME AT THE RESERVATION DESK AT NOON.

FIG. 15

```
I NEED:
1. PERSONAL SERVICE
2. RESERVATION
3. PERSONAL MESSAGE SENT.

MESSAGE CENTER
FROM: JOHN SMITH
DATE: AUG. 5, 2001    TIME: 10:14 AM
MESSAGE:

MEET ME AT THE RESERVATION DESK AT NOON

1. REPLY
2. NO REPLY
```

FIG. 16

```
          REPLY MESSAGE MENU

1. SEND REPLY TO JOHN SMITH:
2. CC TO LOCATION OR ID:
   _____

3. CONTENT OF REPLY:
   _____
   _____
```

FIG. 17

```
                    ┌─134
    SERVICE WORKSTATION MESSAGES

SERVICE NEEDED   LOCATION   TIME IN
  1. REG. COKE     #102       10:45AM
  2. DIET COKE     #104       11:02AM
```

FIG. 18

```
                                 ┌─134
SERVICE WORKSTATION REPLY MESSAGE MENU

1. SEND MESSAGE TO #102
2. CONTENT OF MESSAGE:
  _____
  _____
```

GAMING SYSTEM CUSTOMER SERVICE TECHNIQUES

CROSS-REFERENCE TO RELATED APPLICATIONS

This application is a continuation of prior patent application Ser. No. 09/982,244, filed on Oct. 17, 2001 now abandoned.

The above stated prior application is hereby incorporated by reference in its entirety.

BACKGROUND OF THE INVENTION

This invention relates to gaming systems, and more particularly relates to communications with gaming locations and gaming service stations.

A large casino typically employs thousands of gaming locations that include non-machine games and machine games. Users of the games typically desire to place orders or reservations as they play, and they may desire to exchange messages with other users. Messaging systems used in casinos in the past have failed to provide such capability. For example, U.S. Pat. No. 5,429,361 (Raven et al., issued Jul. 4, 1995), describes a 12 character dot-matrix LED display 30 that can display messages to a player and a keypad that the player can use to send messages to a control unit. However, the system is not sufficiently interactive and flexible to allow users to efficiently place orders or reservations or to exchange messages.

U.S. Pat. No. 5,951,397 (Dickinson, issued Sep. 14, 1999) and U.S. Pat. No. 6,210,279 (Dickinson, issued Apr. 3, 2001) each discloses a touch screen used in a gaming machine. However, the touch screens are CRTs and are used for operation of the game. Such screens would be too large for effective use in a messaging system suitable for coupling to a gaming machine.

This invention addresses the problems presented by the foregoing patents and provides a solution.

BRIEF SUMMARY OF THE INVENTION

One form of the invention is useful in a gaming system comprising a memory, a service station and at least a first gaming location. In such an environment, communication with the service station and the first gaming location is enabling by providing an interactive first communication unit operable from the first gaming location, including a first display visible from the first gaming location and displaying a message depending on a preference of a player stored in the memory before the message is displayed at the first gaming location, an interactive second communication unit operable from the service station, including a second display visible from the service station, and a network arranged to transmit data so that messages are displayed on the first display and the second display.

Another apparatus form of the invention is useful in a gaming system comprising a first gaming location and a second gaming location. In such an environment, communication between the first and second gaming locations is enabled by providing apparatus comprising an interactive first communication unit operable from the first gaming location and arranged to accommodate a first player, the first communication unit including a first display visible from the first gaming location, enabling entry of at least one of a name of a second player and a second player code and enabling entry of a first message, an interactive second communication unit operable from the second gaming location and arranged to accommodate a second player, the second communication unit including a second display visible from the second gaming location, enabling entry of at least one of a name of the first player and a first player code and enabling entry of a second message, and a network arranged transmit data resulting in display of the first message on the second display and arranged to transmit data resulting in display of the second message on the first display.

One method form of the invention is useful in a gaming system comprising a service station, a memory and at least a first gaming location enabling play by a first player. In such an environment, communication with the service station and the first gaming location is enabled by providing steps comprising storing a preference of the first player in the memory, generating messages at the first gaming location and displaying messages visible from the first gaming location interactively after the preference is stored in the memory, generating messages at the first service station and displaying messages visible from the service station interactively, and transmitting the generated messages.

Another method form of the invention is useful in a gaming system comprising a first gaming location arranged to accommodate play by a first player and a second gaming location arranged to accommodate play by a second player. In such an environment, communication between the first and second gaming locations is enabled by providing steps comprising generating messages at the first gaming location and displaying messages from the second gaming location at the first gaming location interactively, enabling entry of at least one of a name of the second player and a second player code from the first gaming location, enabling entry of a first message from the first gaming location, generating messages at the second gaming location and displaying messages from the first gaming location at the second gaming location interactively, enabling entry of at least one of a name of the first player and a first player code from the second gaming location, enabling entry of a second message from the second gaming location, and transmitting the messages between the first and second gaming locations resulting in display of the first message at the second gaming location and display of the second message at the second gaming location.

By using techniques of the foregoing type, communications with gaming locations and/or service stations may be carried out with a degree of ease and reliability previously unavailable.

BRIEF DESCRIPTION OF THE DRAWINGS

FIG. 13 is a block diagram of the message display shown in FIG. 1 with a personal message menu displayed in response to selection of the personal message option shown in FIG. 3.

FIG. 14 is a block diagram of the message display shown in FIG. 1 with an image of a touch screen alphanumeric keypad displayed in response to at least one of options 1, 2 or 3 shown in FIG. 13.

FIG. 15 is a block diagram of a second message display shown in FIG. 1 illustrating delivery of the personal message shown in FIG. 13.

FIG. 16 is a block diagram of the second message display shown in FIG. 15 with a reply message menu.

FIG. 17 is a block diagram of the service center display shown in FIG. 1 with exemplary messages received at the service center.

FIG. 18 is a block diagram of the service center display shown in FIG. 17 with an exemplary reply menu.

DETAILED DESCRIPTION OF THE INVENTION

Figure 1:
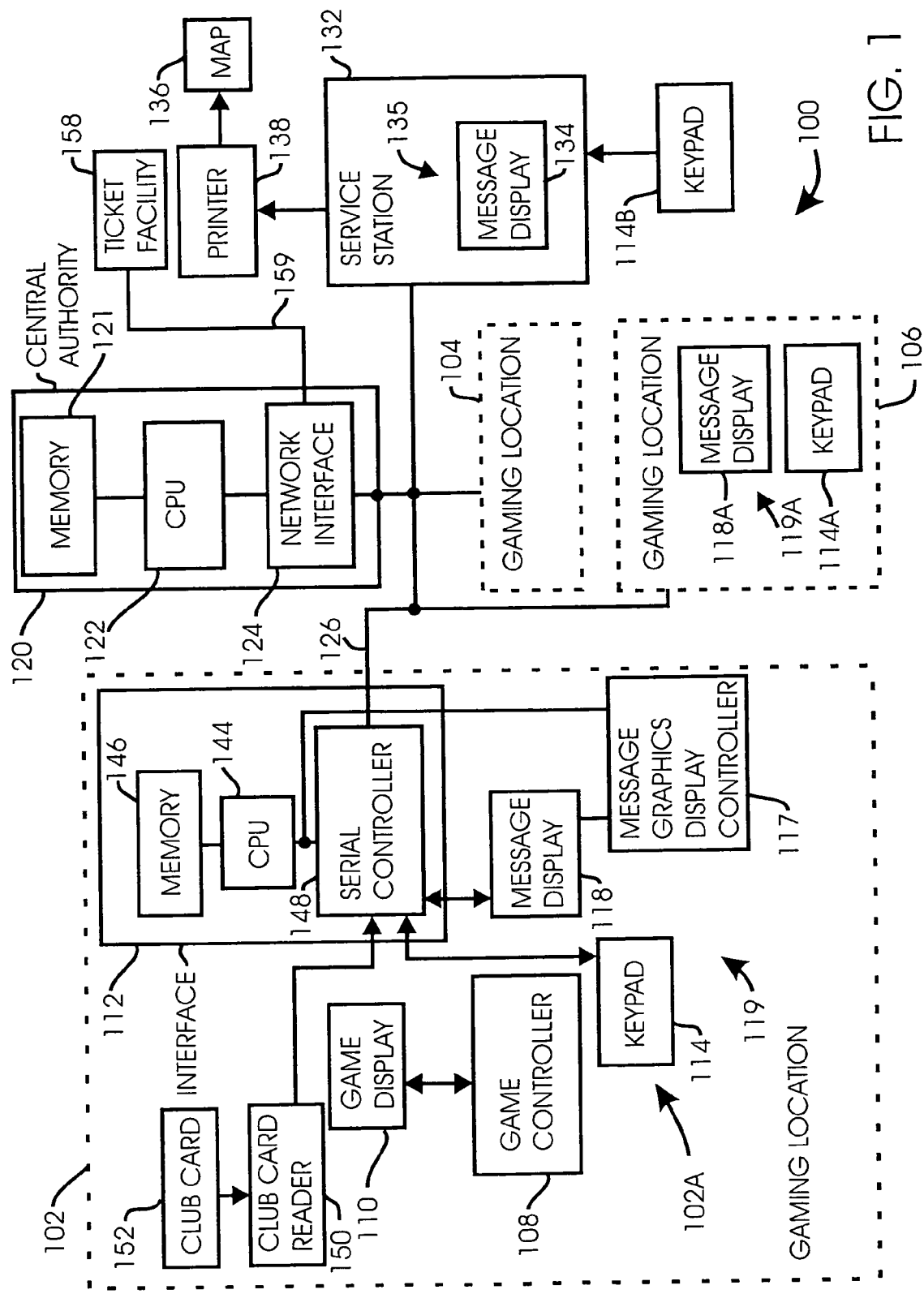
FIG. 1 is a schematic block diagram of one form of gaming system employing a gaming location message display made in accordance with one form of the invention.

Referring to FIG. 1, gaming system 100 includes a several gaming locations 102, 104 and 106 that may include various non-machine games, such as craps and blackjack, or may include game machines, such as slot machines, video poker machines, video roulette machines, and the like.

Gaming location 102 is exemplary of gaming locations 104 and 106. If gaming location 102 includes a gaming machine 102A, a game controller 108 and a game display 110 are provided. For both a non-machine gaming location and a game machine location, a location interface 112, an optional alphanumeric keypad 114 and a touch screen message display 118 are provided. Display 118 may comprise a touch screen liquid crystal display (LCD) similar to the displays used in laptop computers. Display 118 is coupled to or located inside the cabinet of gaming machine 102A, and may, for example, take the form of a rectangle about 3 inches high and 4 inches wide. Using an LCD inside a gaming machine in order to display graphics images and to display a numeric or alphabetic input image is advantageous because it eliminates the need for a separate keypad for the interactive entry of data. In addition, an LCD requires less space than many other types of displays. These considerations are important, because there usually is very limited space inside or adjacent a gaming machine. An optional alphanumeric keypad 114 may be placed for convenient manipulation while a player is using gaming location 102.

A conventional graphics display controller 117 controls display 118. Controller 117 can display either vector graphics or bit-mapped graphics on display 118, depending the type of application program stored in memory 146 used for graphic display and the type of data stored for purposes of generating graphics images. The image data resulting in graphics images can be stored in memory 146 or can be stored in memory 121 and transmitted via network 126 to controller 117 for a particular graphic image. The image data can be either vector data or bit-mapped data. CPU 144 controls the transfer of the image data to controller 117 in response to application programs stored in memory 146 that determine the location of the graphics images on display 118 and also determine the time at which the graphics displays are presented.

Interface 112, optional keypad 114, controller ill and display 118 comprise an interactive communication unit 119. Each of the gaming locations 104 and 106 include an interactive communication unit like unit 119. For example, gaming location 106 includes a communication unit 119A like unit 119. In one embodiment, a player enters alphabetic and numeric information by touching display 118. In such an embodiment, keypad 114 may not be provided. For the non-machine gaming locations, interface 112 comprises a communication controller 148, such as a modem.

In this specification and claims, interactive means capable of accepting input from a human. Communication unit 119 comprises one or more programs for accepting such input from, for example, a touch screen alphanumeric keyboard image. Such programs are well known to those skilled in computer communication.

For a game machine location, interface 112 may include, for example, an RS485 interface such as that implemented by a Sentinel™ Interface from Casino Data Systems. Other interfaces and network architectures (e.g., Ethernet, parallel port, and the like) may be substituted however. Furthermore, interface 112 may implement, for example, the IGT Gaming SAS™ communication protocol or the CDS GDAP™ communication protocol for communication with gaming machine 102A, or a custom communication protocol. In gaming machine 102A, message display 118 may be coupled to the frame of the gaming machine or may be inside the cabinet of the gaming machine. However, any means of associating display 118 with gaming machine 102A may be used as long as display 118 is visible from gaming machine 102A.

Interface 112 is programmed to provide an interactive messaging operation. That is, user message activity, such as touching an active area of display 118 or entering information from keypad 114, causes a response from or action by system 100. One such response is the sending of data over network 126 to another location within system 100 so that a message is displayed. Another response is the display of a menu that depends on the area touched and/or user preferences.

User preferences may be stored in interface memory 146 that is controlled by a CPU 144. CPU 144 controls the sending of messages by gaming location 102, the receipt of messages by gaming location 102 and the display of messages by gaming location 102 in a well known manner.

Game controller 108 is responsible for operation of the gaming machine 102A. Thus the game controller may include a microprocessor, memory, game software, and support circuitry to implement a slot machine or other type of game. The display 110 provides displays necessary for the play of the game, such as a display of slot machine rotors.

Gaming location 102 also includes a club card reader 150 that can read a MAG number located on a magnetic strip of a club card 152, which may, for example, be a smart card. The MAG number is unique for each player. Card 152 also sometimes bears a player ID number that is human readable, but is not machine-readable. The card reader sends the MAG number to central authority 120, which converts the MAG number to an OCR number. This feature prevents any potential misuse due to fraudulent creation of a bogus club card. Memory 121 maintains a table that correlates OCR numbers with player ID numbers. An example of misuse prevented or inhibited by converting the MAG number to an OCR number is as follows. The clerks at the stations generally have access to the OCR numbers, but not the MAG numbers. As a result, a person operating outside system 100 could not duplicate a new player card with a MAG number corresponding to an existing club card. If such a person could duplicate an existing club card, the person may be tempted to use the duplicate card to cash out a player's account. The conversion of the MAG number to an OCR number is an important feature that inhibits such temptation.

Central authority 120 translates an OCR number to a corresponding player ID number. This feature allows a single player ID number to identify more than one OCR number. The player ID number can be used by the central authority to address the value of an account corresponding to the player ID number or to access preferences of the player. Thus, the central authority keeps no account value or preferences corresponding to the MAG number or OCR number; it only keeps an account value and preferences corresponding to the player ID number, correlated with the OCR number by a table.

Player preferences may include preferences for drinks, cigarettes, snacks and the like. In addition, memory 121 may store a preference authorizing the player to be located by having central authority 120 correlate his player ID number with the gaming location at which his club card 152 was read.

When central authority 120 locates a player, it sends data to station 132 via network 126 that results in an electronic or printed display. For example, a printed display may result in a map 136 printed by a printer 138 attached to the station. Alternatively, the map may be displayed on display 134. The map provides a floor plan of the casino or other facility in which system 100 is located, the location of the service station and the location at which card 152 was entered in a card reader, such as gaming location 102.

Club cards are generated by having a player fill out a form and by submitting the form to a clerk at a station that is equipped with a card creator (not shown). Typically, a card creator is located at only one or two work stations, such as service station 132, within a gambling facility. The clerk keys information into the station, and the information is transmitted to central authority 120, which then generates an OCR number, corresponding MAG no. and player ID number for the creation of a new club card. The OCR number and player ID number are stored in the data base in memory 121 in the manner previously described. The central authority then causes the card creator to create a new club card with the stored player ID number and MAG number. Thus, the OCR number is not stored in memory 121 by having the new club card read by a card reader. Once the MAG, OCR and player ID numbers are created, they cannot be changed by a person operating outside system 100.

Central authority 120 includes a central processing unit (CPU) 122 that operates through a network interface 124 and a network 126 to enable communication of the preferences with gaming locations 102, 104 and 106. Network 126 may be a conventional local area network, which allows messages to be sent directly between any of gaming locations 102, 104 and 106, service station 132 and central authority 120. Memory 121 also may store data for various displays shown in FIGS. 2-19. Alternatively, the data for the displays may be stored locally in the memories for each of the gaming locations, such as memory 146.

Service stations, such as station 132, connect to central authority 120 and gaming locations 102, 104 and 106 over network 126. Service station 132 includes an interface like interface 112, a touch screen display 134 like display 118 and a keypad 114B like keypad 114, as well as a communication unit 135 like unit 119. Service stations typically are located near a source of drinks and snacks that may be ordered by players or users of system 100. Several stations, like station 132, typically are scattered throughout a large gaming facility.

Figure 2:
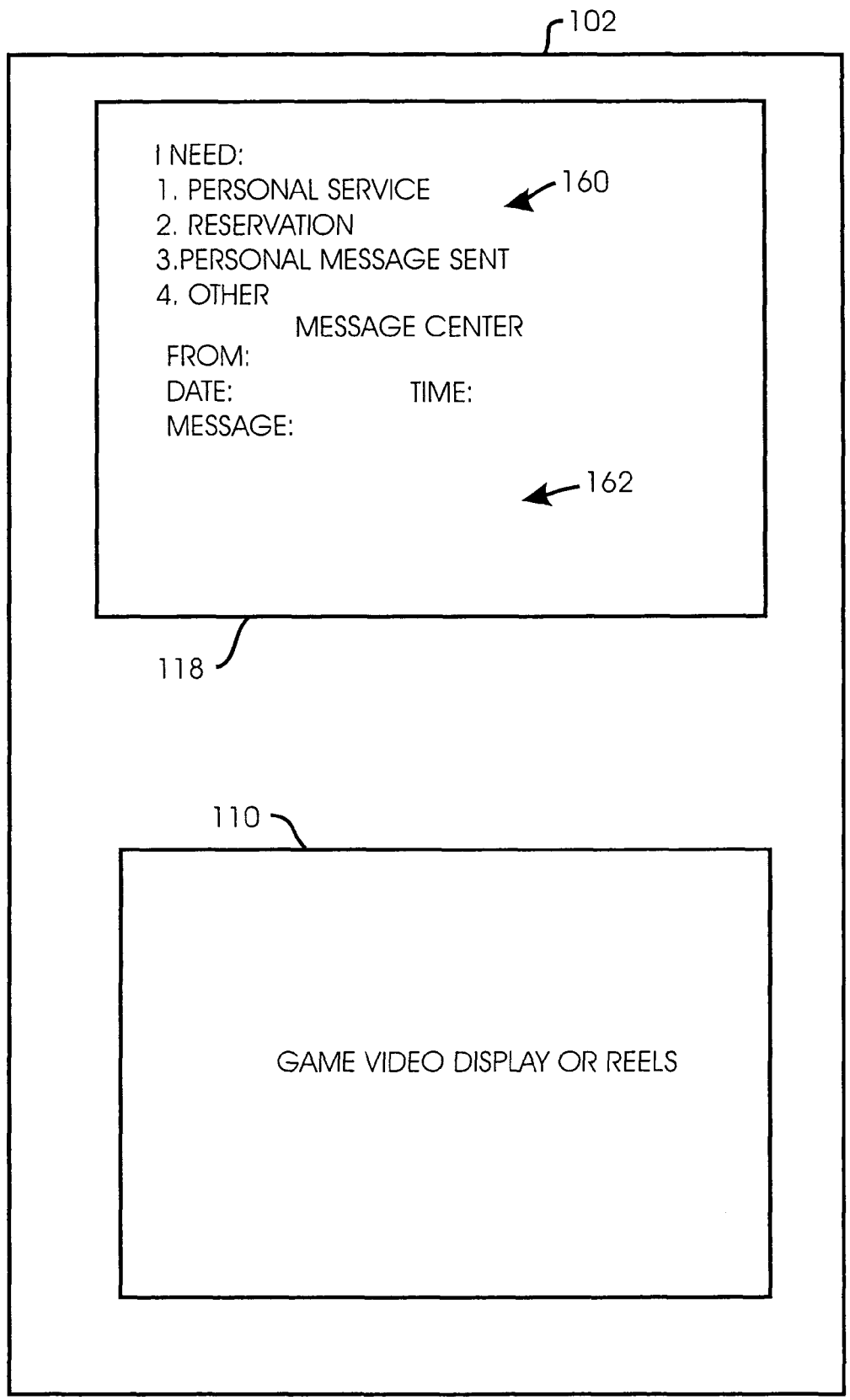
FIG. 2 is a block diagram of one of the gaming location message displays shown in FIG. 1, together with a game video display.

FIG. 2 illustrates message display 118 in relationship to game display 110. Display 118 illustrates an exemplary menu of options 160 for a player or user of system 100, as well as an exemplary space for receipt of messages 162. Display 118 may be implemented as a window in display 110.

Figure 3:
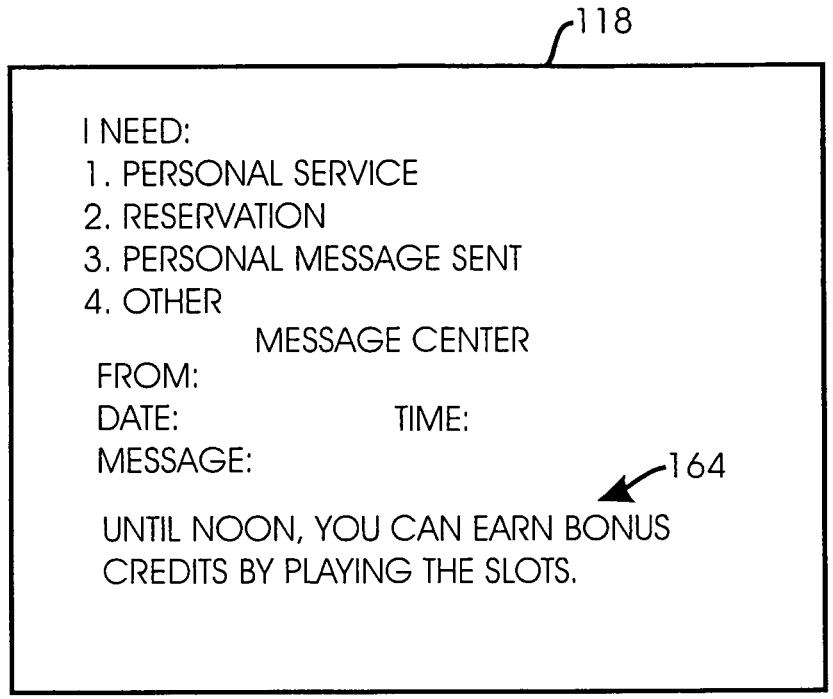
FIG. 3 is a block diagram of the message display shown in FIG. 1 with an exemplary service menu, including a personal service option, a reservation option and a personal message option, and a message menu with a displayed advertisement.

FIG. 3 illustrates display 118 with an exemplary advertisement 164. Any type of advertisement may be generated by central authority 120 and sent to any gaming location for display. FIG. 3 also shows an exemplary menu by which a user may chose the type of service desired by touching an appropriate portion of display 118 or entering a corresponding number on keypad 114. The advertisement may be displayed without the menu if desired.

Figure 4:
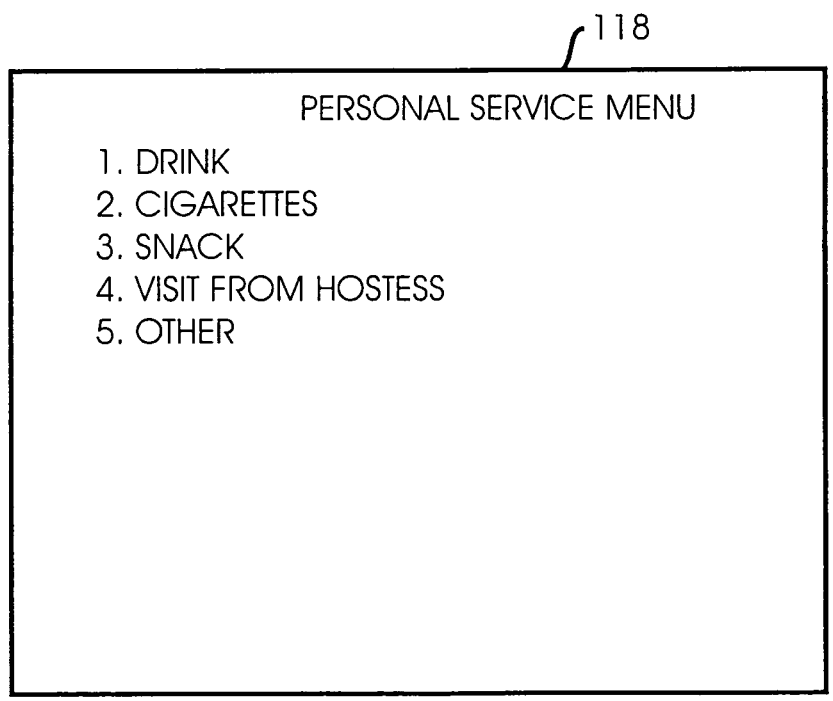
FIG. 4 is a block diagram of the message display shown in FIG. 1 with a personal service menu, including a drink option, displayed in response to the selection of the personal service option shown in FIG. 3.

FIG. 4 illustrates display 118 with an exemplary personal service menu displayed in response to a player or user touching the term "PERSONAL SERVICE" on display 118 or entering the number 1 on keypad 114. The items in the personal service menu may depend on the preferences accessed from memory 121 when the user's club card is read by reader 150. For example, a smoker whose preferences include cigarettes will have item 2 "CIGARETTES" displayed, whereas a non-smoker whose preferences do not include cigarettes will not have item 2 displayed.

Figure 5:
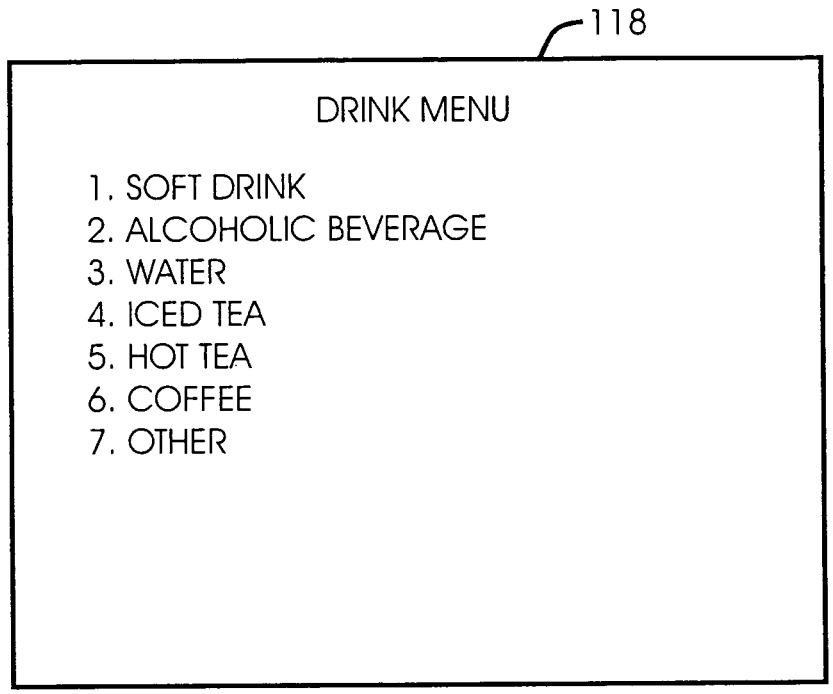
FIG. 5 is a block diagram of the message display shown in FIG. 1 with a drink menu, including a soft drink option, displayed in response to the selection of the drink option in FIG. 4.

FIG. 5 illustrates an exemplary drink menu displayed in response to a player or user touching the phrase "DRINK" on the display shown in FIG. 4, or entering the number 1 on keypad 114. The drinks displayed may depend on the player preferences accessed from memory 121.

Figure 6:
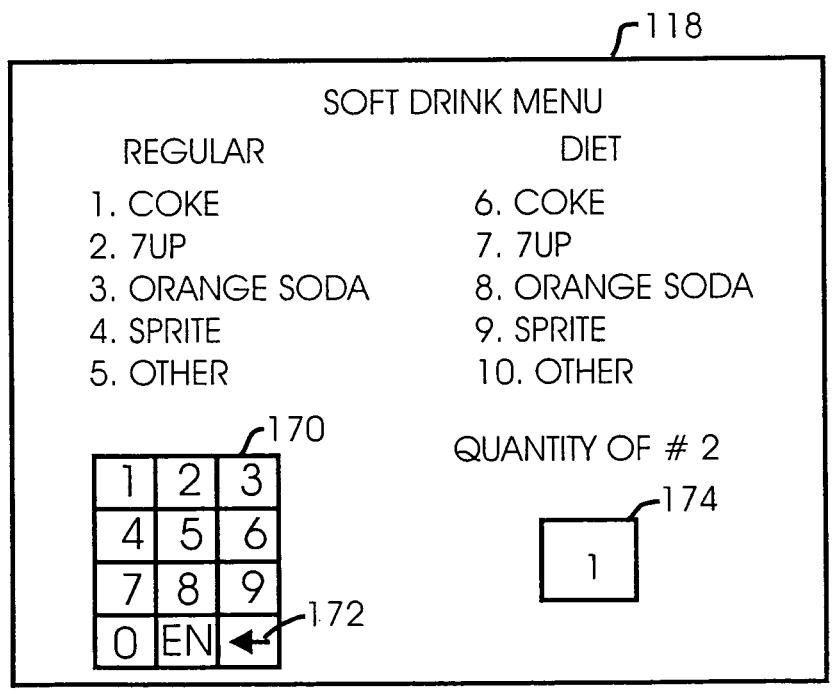
FIG. 6 is a block diagram of the message display shown in FIG. 1 with a soft drink menu displayed in response to the selection of the soft drink option in FIG. 5, including an image of a touch screen numerical keypad for entering quantity.

FIG. 6 illustrates an exemplary soft drink menu displayed in response to a player or user touching the screen 118 at the phrase "SOFT DRINK" on the display shown in FIG. 5. The listed drinks may depend on the player preferences accessed from memory 121. When a player selects a particular drink from the FIG. 6 display by touching display 118 at the text corresponding to the desired drink, a numeric input image, such as an image of a numeric keypad 170, is displayed as shown. In this example, it is assumed that the player touched "7UP" by the number 2 or touched the number 2. The text "EN" provides an enter function and an arrow 172 provides a backspace function. Other forms of a numeric input image may be displayed. A box 174 displays the number entered by the player from keypad image 170. The number indicates the quantities of drinks desired by the player. Each of displays 118, 118A and 134 can display a numeric input image like image 170.

Communication unit 119 generates a message identifying the drink selected by touching display 118 (e.g., drink number 2) and the quantity selected by touching a number on the keypad image 170 (e.g., the number 1). The message is transmitted via controller 148 and network 126 to service station 132 and is displayed on message display 134.

Figure 7:
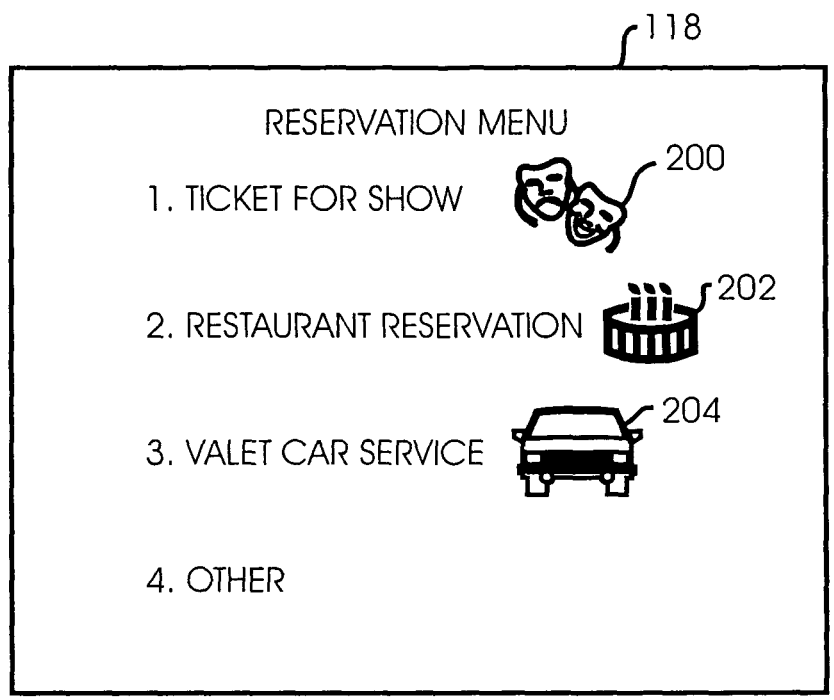
FIG. 7 is a block diagram of the message display shown in FIG. 1 with a reservation menu, including a ticket for show option, displayed in response to selection of the reservation option shown in FIG. 3.

FIG. 7 illustrates an exemplary reservation menu displayed on display 118 in response to a player or user touching the phrase "RESERVATION" or the number 2 on the display shown in FIG. 3, or by entering the number 2 on keypad 114. The message display includes graphics images in the form of a pair of masks 200, a cake 202 and a car 204. The graphics images may be in color. For example, masks 200 may be displayed in red, cake 202 may be displayed in yellow, and car 204 may be displayed in blue. Many other forms of graphics images can be used to illustrate the text appearing on any of the displays described in this specification. Alternatively, the graphics images can be shown alone without any text.

Figure 8:
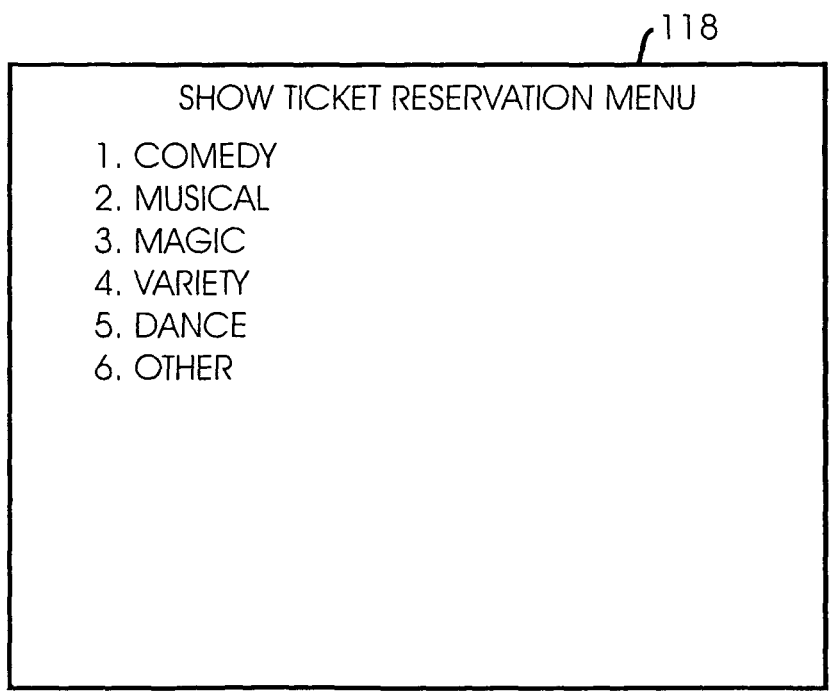
FIG. 8 is a block diagram of the message display shown in FIG. 1 with a show ticket reservation menu, including a comedy option, displayed in response to selection of the ticket for show option shown in FIG. 7.

FIG. 8 illustrates an exemplary show ticket reservation menu displayed on display 118 in response to a player or user touching the phrase "TICKET FOR SHOW" or the number 1 on the display shown in FIG. 7, or by entering the number 1 on keypad 114. The items listed in FIG. 8 may depend on the player's preferences stored in memory 121.

Figure 9:
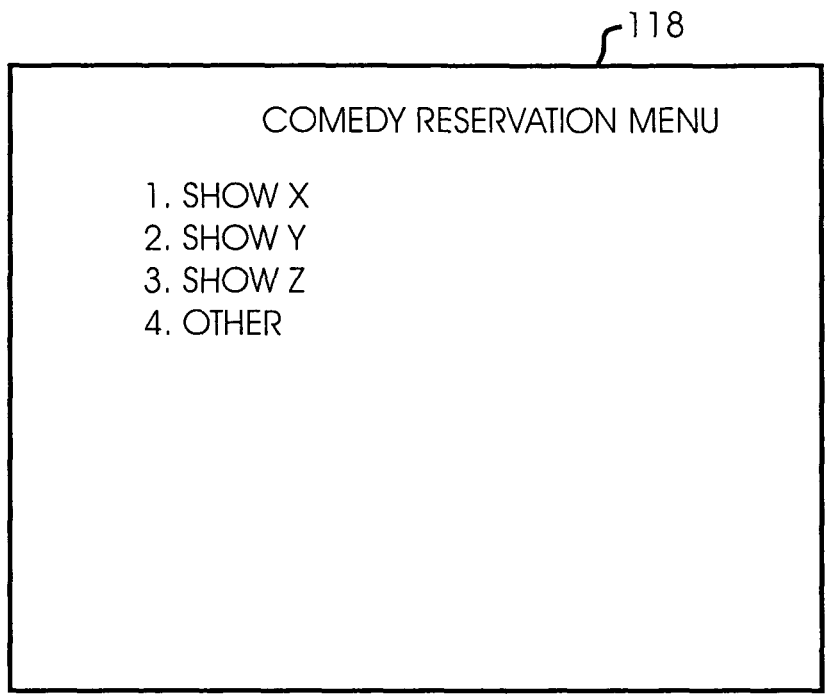
FIG. 9 is a block diagram of the message display shown in FIG. 1 with a comedy reservation menu, including a show x option, displayed in response to selection of the comedy option shown in FIG. 8.

FIG. 9 illustrates an exemplary comedy reservation menu displayed on display 118 in response to a player or user touching the phrase "COMEDY" or the number 1 on the display shown in FIG. 8, or by entering the number 1 on keypad 114. The items listed may depend on the player's preferences stored in memory 121.

Figure 10:
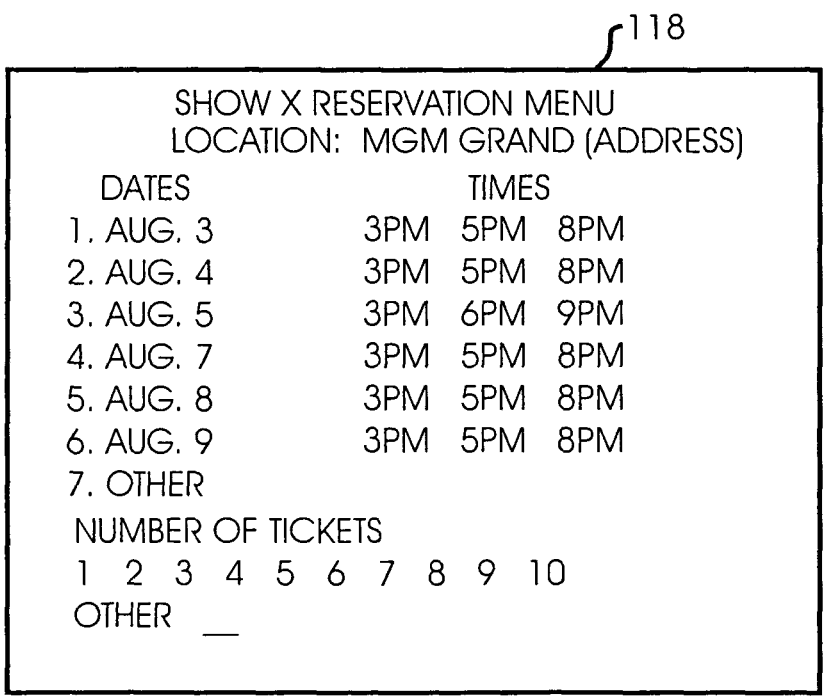
FIG. 10 is a block diagram of the message display shown in FIG. 1 with a show x reservation menu displayed in response to selection of the show x option of FIG. 9.
Figure 11:
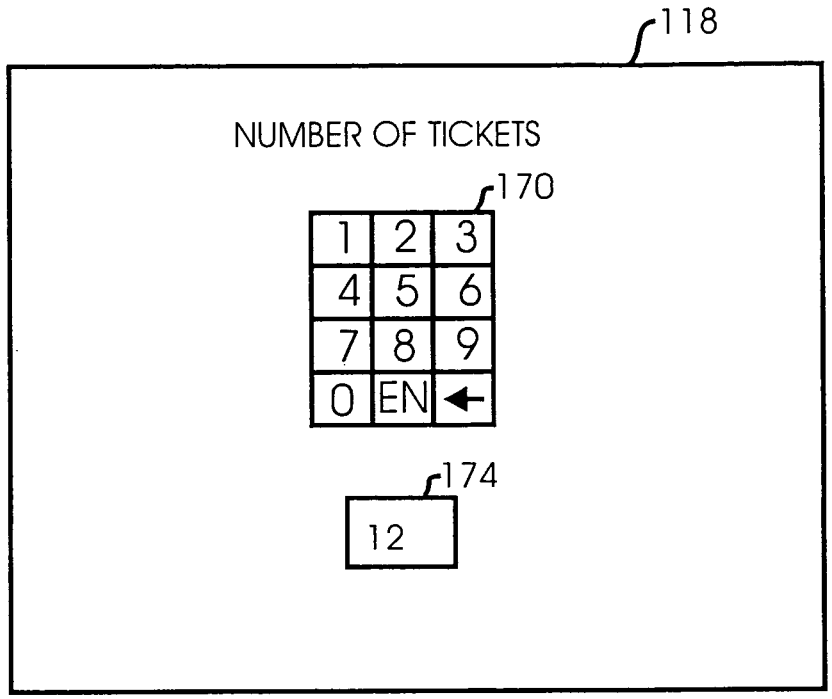
FIG. 11 is a block diagram of the message display shown in FIG. 1 with an image of a touch screen numerical keypad displayed in response to selection of the "other" option of FIG. 10.

FIG. 10 illustrates an exemplary show x reservation menu displayed on display 118 in response to a player or user touching the phrase "SHOW X" or the number 1 or the number 2 on the display shown in FIG. 9, or by entering the number 1 on keypad 114. The user enters the number of tickets desired in the blank space provided by using keypad 114 or by touching the appropriate number below the legend "NUMBER OF TICKETS." If the desired number of tickets is not displayed, the player touches "OTHER" in order to display the image of numeric input keypad 170 as shown in FIG. 11. The player then enters the desired number of tickets by touching an appropriate combination of numbers on image 170. Box 174 displays the number entered by the player.

Communication unit 119 generates a message identifying the desired show, date (s), time (s) and number of tickets indicated by the player's touching of display 118 as described in connection with FIGS. 7-11. The message is transmitted via controller 148 and network 126 to service station 132 and is displayed on message display 134. Alternatively, the message may be sent to a ticket handling facility 158 of a producer or ticket agent of the requested show via a network 159, such as the Internet through central authority 120.

Figure 12:
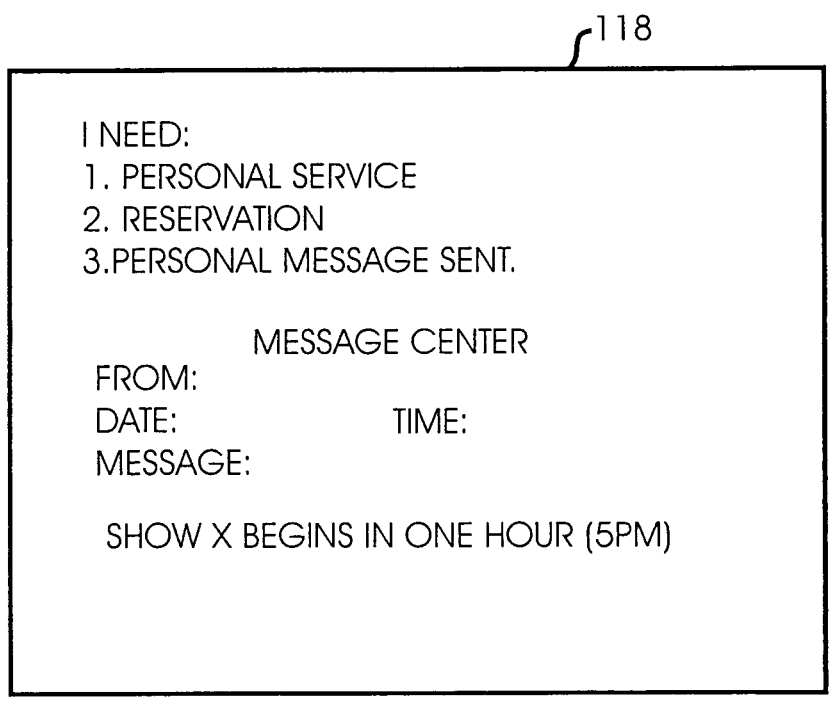
FIG. 12 is a block diagram of the message display shown in FIG. 1 with a reminder message displayed in response to selection of the show x reservation selection shown in FIG. 10.
Figure 19:
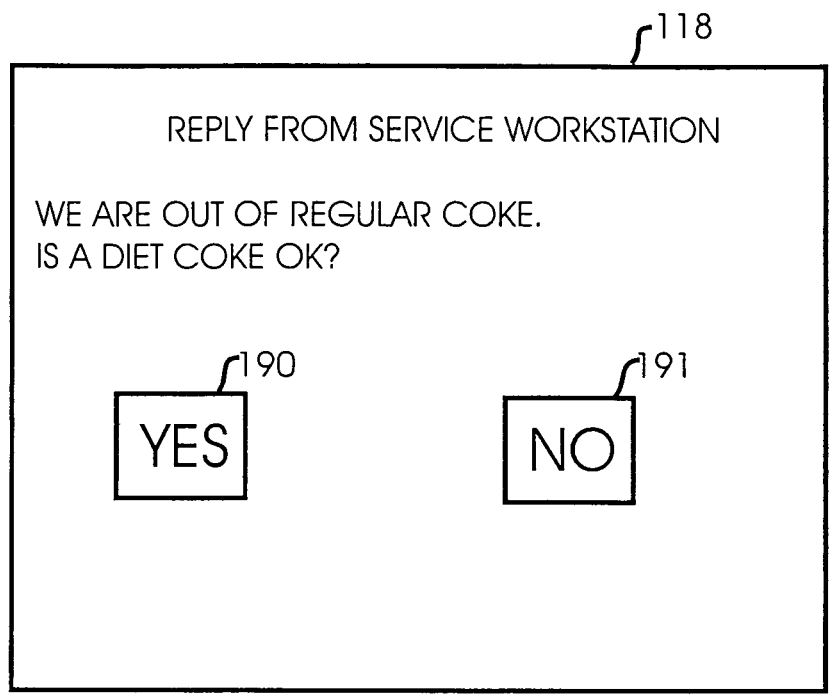
FIG. 19 is a block diagram of the second message display shown in FIG. 15 illustrating delivery of a message from the service center and providing for a yes or no response.

FIG. 12 illustrates an exemplary reminder message sent to display 118 from central authority 120 or station 132.

FIG. 13 illustrates an exemplary personal message menu displayed on display 118 in response to a player or user touching the phrase "PERSONAL MESSAGE SENT" or the number 3 on the display shown in FIG. 3, or by entering the number 3 on keypad 114. When the player touches any of numbers 1-3 shown in FIG. 13, or touches the text opposite the numbers, an alphanumeric input image, such as an image of an alphanumeric keypad 180, is displayed on display 118 as shown in FIG. 14. Arrow 182 represents a backspace function, the word "ENTER" represents an enter function. The word "SHIFT" represents a shift function between upper case and lower case letters. The punctuation marks shown in image 180 have their normal meanings.

The player causes controller unit 119 to generate an appropriate message by entering the name of a person for whom the message is intended (e.g., John Doe), a game location (e.g., 106) or player ID number, and a message, such as "MEET ME AT THE RESERVATION DESK AT NOON," by touching display 118 at the appropriate numbers and letters of image 180. The data entered by the player is displayed as shown in FIG. 14. Each of displays 118, 118A and 134 can display an alphanumeric input image like image 180. Alternatively, the message shown in FIG. 14 may be typed by the player or user by operating keypad 114.

Communication unit 119 generates a message based on the data entered by the player as explained in connection with FIG. 14. The message includes an identification of the gaming location (e.g., 106) to which the message is to be sent or a player ID number. The message is transmitted via controller 148 and network 126 to central authority 120. If a player ID number was entered, central authority 120 checks the ID numbers of players whose cards have been read by the system to find a match. If a match is located, the message is forwarded to the gaming location at which the card was read. If no match is found, the system stores the message in memory 121. When the player with the correct ID number inserts his card into a reader, the message is retrieved from memory and is forwarded to the proper gaming location for display. In addition, central authority 120 finds the name of the current user of gaming location 102 from the information on the club card 152 used to initiate the gaming location so that the name of the sender can be displayed at the gaming location receiving the message. If a gaming location was entered by the player, central authority sends the message to the proper gaming location, such as location 106, and displays on display 118A the name of the sender, the date, the time the message was sent and the message as shown in FIG. 15.

FIG. 15 illustrates the an exemplary message menu displayed on display 118A of gaming location 106 showing the message sent from gaming location 102 to gaming location 106 over, network 126 through central authority 120. If a gaming location is entered by the player as explained in connection with FIG. 14, the message may be sent directly from gaming location 102 to gaming location 106 without being transmitted to the central authority 120. The date and time at which the message was sent are displayed as shown in FIG. 15.

The player at gaming location 106 may reply to the message shown in FIG. 15 by touching display 118A at the "REPLY" text, at the number 4 to the left of the reply text, or by entering the number 4 on keypad 114A.

FIG. 16 illustrates an exemplary reply message menu displayed on display 118A in response to a player or user touching the phrase "REPLY" or the number 4 on screen 118A or by entering the number 4 on keypad 114A. The reply menu provides for sending copies of the message to various locations. The personal message menu shown in FIG. 13 can be modified to also provide for sending of copies.

A reply message is generated and sent in the same manner described in connection with FIGS. 13 and 14. When the player touches any of numbers 1-3 or the text opposite any of the numbers, a display of the type shown in FIG. 14 is generated on display 118A. The player then enters the reply data using image 180 in the manner previously described.

FIG. 17 illustrates exemplary messages received at service station 132 and displayed on display 134 from gaming locations 102 and 104. In response to such messages, workers in the gaming facility may attempt to fill the order and bring it to the player or user. The location of the requester of service is displayed to help facilitate delivery. The time is posted to ensure that orders are processed in the order in which they were sent.

FIG. 18 illustrates an exemplary service station reply message menu displayed in response to a work station attendant touching the phrase "REG. COKE" on the display 134 shown in FIG. 17, or entering the number 1 on keypad 114B. The attendant can enter a message by touching the number 2 or touching the phrase "CONTENT OF MESSAGE" shown in FIG. 18 which causes display of an alphanumeric input image on display 134 like the image shown in FIG. 14. A message then is entered in the manner described in connection with FIG. 14. For example, the message may be "WE ARE OUT OF REGULAR COKE. IS A DIET COKE OK?" By enabling interactive communication between a gaming location and a service station, the delivery of desired goods to gaming locations is facilitated.

Communication unit 135 generates a message based on the data entered by an attendant as explained in connection with FIGS. 14 and 18. The message includes an identification of the gaming location (e.g., 102) to which the message is to be sent. The message is transmitted via a serial controller in service station 132 and network 126 to gaming location 102 and is displayed on display 118 in the manner shown in FIG. 19.

The message from the service center is displayed with a YES button 190 and a NO button 191. The player at gaming location 102 responds to the message by touching display 118 at either the word "YES" or "NO." Communication unit 119 generates a message based on the touching of button 190 or 191. The message includes an identification of service station 132 to which the message is to be sent. The message is transmitted via serial controller 148 and network 126 to service station 132 and is displayed on display 134 so that an attendant will know the drink preferred by the player.

Those skilled in the gaming and computer arts are able to program the interfaces and central authority to provide the displays and interactivity described in the accompanying drawings and described in this specification.

The "OTHER" options referenced in the drawings are handled by displaying a numeric or alphanumeric input image depending on context.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. In a casino gaming system comprising a plurality of casino gaming locations, apparatus for enabling communication between a first and a second casino gaming location comprising:

a first gaming terminal operable from the first casino gaming location, and arranged to facilitate play of a first game by a first player, the first gaming terminal including a first display visible from the first casino gaming location, the first display being arranged to concurrently provide a first portion arranged to display the first game and a second portion enabling entry of at least one of a name of a second player and a second player code and enabling entry of a first message for the second player even when the second player is not at any casino gaming location;

a second gaming terminal operable from the second casino gaming location, and arranged to facilitate play of a second game by a second player, the second gaming terminal including a second display visible from the second casino gaming location, the second display being arranged to concurrently provide a third portion arranged to display the second game and a fourth portion enabling entry of at least one of a name of the first player and a first player code and enabling entry of a second message for the first player even when the first player is not at any casino gaming location;

a network arranged to transmit data resulting in display of a first menu including the first message and the name of the first player on the second display, the first menu enabling selection of a reply menu allowing the second player to enter a reply message to the first player even when the first player is not at any casino gaming location, the network also being arranged to transmit data resulting in display of a second menu including the second message and the name of the second player on the first display, the second menu enabling selection of a reply menu allowing the first player to enter a reply message to the second player even when the second player is not at any casino gaming location; and a casino central authority arranged: (1) to store player casino account and player identification information; (2) to locate the second gaming terminal associated with the second player identified as the recipient of the first message and to locate the first gaming terminal associated with the first player identified as the recipient of the second message; (3) to save the first message until the second gaming terminal is located; (4) to forward the first message to the second gaming terminal associated with the second player; (5) to save the second message until the first gaming terminal is located; and (6) to forward the second message to the first gaming terminal associated with the first player.

2. The apparatus of claim 1 wherein the casino central authority is arranged to identify the first casino gaming location in response to at least one of the name of the first player and the first player code and arranged to identify the second casino gaming location in response to at least one of the name of the second player and the second player code.

3. The apparatus of claim 1 and further comprising a first card reader operable from the first casino gaming location and a second card reader operable from the second casino gaming location, the first and second card readers being operable to read a code from a card entered by a player and wherein the casino central authority identifies the first casino gaming location based on the code read at the first casino gaming location and data entered at the second casino gaming location and identifies the second casino gaming location based on the code read at the second casino gaming location and data entered at the first casino gaming location.

4. The apparatus of claim 1 wherein the code comprises a player ID number.

5. The apparatus of claim 1 wherein the first gaming terminal further comprises an alphanumeric keypad operable from the first casino gaming location and wherein the second message comprises data entered on the keypad.

6. The apparatus of claim 1 wherein each of the first gaming terminal and second gaming terminal displays an image on one of the first display and second display suitable for entry of at least one of numeric data and alphabetic data by touching one of the first display and second display.

7. In a gaming system comprising a plurality of casino gaming locations and a casino central authority storing player casino account and player identification information, a method of enabling communication between a first casino gaming location arranged to facilitate play of a first game by a first player and a second casino gaming location arranged to facilitate play of a second game by a second player, wherein a first display visible from the first casino gaming location is arranged to concurrently provide a first portion arranged to display the first game and a second portion, and wherein a second display visible from the second casino gaming location is arranged to concurrently provide a third portion arranged to display the second game and a fourth portion, comprising:

generating messages at the first casino gaming location and displaying messages from the second casino gaming location at the first casino gaming location interactively;

enabling entry of at least one of a name of the second player and a second player code from the first casino gaming location using the second portion provided by the first display;

enabling entry of a first message for the second player from the first casino gaming location using the second portion provided by the first display, even when the second player is not at any casino gaming location;

saving the first message for the second player from the first casino gaming location in a memory when the second player is not at any casino gaming location;

retrieving the first message from the memory and forwarding the first message for the second player from the first casino gaming location after the casino central authority has located the second player at the second casino gaming location;

generating messages at the second casino gaming location and displaying messages from the first casino gaming location at the second casino gaming location interactively;

enabling entry of at least one of a name of the first player and a first player code from the second casino gaming location using the fourth portion provided by the second display;

enabling entry of a second message for the first player from the second casino gaming location using the fourth portion provided by the second display, even when the first player is not at any casino gaming location;

saving the second message for the first player from the second casino gaming location in the memory when the first player is not at any casino gaming location;

retrieving the second message from the memory and forwarding the second message for the first player from the second casino gaming location after the casino central authority has located the first player at the first casino gaming location;

transmitting the messages between the first and second casino gaming locations resulting in display of a first menu including the first message and the name of the first player at the second casino gaming location and display of a second menu including the second message and the name of the second player at the first casino gaming location;

enabling selection of a first reply menu from the first menu;

allowing from the first reply menu the second player to enter a reply message to the first player using the fourth portion provided by the second display, even when the first player is not at any casino gaming location;

saving the reply message for the first player in the memory when the first player is not at any casino gaming location;

retrieving the reply message from the memory and forwarding the reply message for the first player after the casino central authority has located the first player at the first casino gaming location;

enabling selection of a second reply menu from the second menu;

allowing from the second reply menu the first player to enter a reply message to the second player using the second portion provided by the first display, even when the second player is not at any casino gaming location;

saving the reply message for the second player in the memory when the second player is not at any casino gaming location; and retrieving the reply message from the memory and forwarding the reply message for the second player after the casino central authority has located the second player at the second casino gaming location.

8. The method of claim 7 wherein at least one of the messages generated at the second casino gaming location comprises a reply to a message generated at the first casino gaming location.

9. The method of claim 7 wherein at least one of the messages generated at the first casino gaming location comprises a reply to a message generated at the second casino gaming location.

10. The method of claim 7 wherein the first casino gaming location comprises a touch screen display and wherein said generating messages at the first casino gaming location comprises touching the display.

11. The method of claim 7 wherein the code comprises a player ID number.

12. The method of claim 7 wherein the first casino gaming location comprises a keypad and wherein said generating messages at the first casino gaming location comprises entering data from the keypad.

13. The method of claim 7 wherein said generating messages at the first casino gaming location comprises:
generating an image of an alphabetic input; and
generating messages at the first casino gaming location at least in part in response to touching of the image.

14. The method of claim 7 wherein said generating messages at the second casino gaming location comprises:
generating an image of an alphabetic input; and
generating messages at the second casino gaming location at least in part in response to touching of the image.

15. In a gaming system comprising a plurality of casino gaming locations and a casino central authority storing player casino account and player identification information, a method of enabling communication between a first casino gaming location arranged to facilitate play of a first game by a first player and a second casino gaming location arranged to facilitate play of a second game by a second player, wherein a first display visible from the first casino gaming location is arranged to concurrently provide a first portion arranged to display the first game and a second portion, and wherein a second display visible from the second casino gaming location is arranged to concurrently provide a third portion arranged to display the second game and a fourth portion, comprising:

enabling the first player to enter at the first casino gaming location an identification of the second casino gaming location using the second portion provided by the first display;

enabling the first player to enter at the first casino gaming location a message for the second player using the second portion provided by the first display;

locating the second casino gaming location based on the entered identification of the second casino gaming location, wherein the step of locating the second casino gaming location is performed by the casino central authority;

transmitting the message from the first to the second casino gaming location;

displaying the message at the second casino gaming location such that it is visible to the second player.

\* \* \* \* \*

UNITED STATES PATENT AND TRADEMARK OFFICE
CERTIFICATE OF CORRECTION

| | | |
|---|---|---|
| PATENT NO. | : 8,529,347 B2 | Page 1 of 1 |
| APPLICATION NO. | : 11/303240 | |
| DATED | : September 10, 2013 | |
| INVENTOR(S) | : D'Amico et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this
Seventeenth Day of February, 2015

Michelle K. Lee
*Deputy Director of the United States Patent and Trademark Office*